UNITED STATES PATENT OFFICE 2,538,341

METHOD FOR PRODUCING 1-HYDROXY-ISOQUINOLINES

Glenn E. Ullyot, Philadelphia, Pa., assignor to Smith, Kline & French Laboratories, Philadelphia, Pa., a corporation of Pennsylvania No Drawing. Application September 20, 1949, Serial No. 116,867

5 Claims. (Cl. 260—289)

This invention relates to a method for the preparation of pyridine derivatives of certain structure which find utility as intermediates in the preparation of further compounds which have physiological activity as anesthetics and as antispasmodic agents.

The process in accordance with this invention is adapted for the production of pyridine derivatives having the following structure:

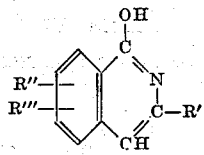

where R' is a member of the group consisting of hydrogen, alkyl groups having not more than ten carbon atoms, a phenyl group and phenylalkyl groups, the alkyl portion of which has not more than three carbon atoms; R" and R''' are members of the group consisting of hydrogen, hydroxyl, methyl, methoxy, ethoxy, amino, acylamino having not in excess of 5 carbon atoms and alkylamino having not in excess of three carbon atoms, the said substituents being so chosen that the number of nitrogen atoms in the substituents does not exceed one.

Generally speaking, the procedure comprising the method according to this invention will involve the rearrangement of an amine having the structure:

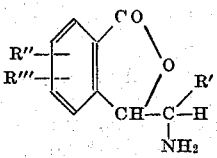

where R', R" and R''' are as given above.

For the preparation of typical starting materials having the above structure for the preparation of compounds according to this invention see Ullyot, et al. Journal Organic Chemistry, vol. 10, pp. 429–440 (1945), United States Letters Patent No. 2,473,484, dated June 14, 1949, and Ullyot, Taylor and Dawson Journal American Chemical Society, 70, 542 (1948).

More specifically, in proceeding according to the method embodying this invention, to a solution of a salt of an amine having the above formula in any suitable solvent, such as water, aqueous ethanol, aqueous isopropanol, or the like, is added an alkali such as sodium hydroxide, potassium hydroxide, ammonia, or the like, and the resulting solution is allowed to stand at room temperature until rearrangement occurs. If desired, and for a saving of time it generally will be desirable, the solution or mixture of the amine salt and alkali may be heated to hasten the rearrangement.

If desired one may start with an amine base of the above structure, in which case use of an alkali, while desirable, will not in all cases be necessary.

When the rearrangement has occurred, the rearranged product will, in certain cases, separate from the solution and may be readily recovered. Again, where the rearranged product does not readily separate from the solution, separation may be accomplished by concentrating the solution and cooling.

The rearrangement will result in production of a compound having the following structure:

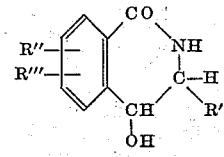

Intermediate I where R', R" and R''' are as given above.

The product of the rearrangement having the above structure will be dehydrated by heating at a temperature above its melting point and below its decomposition point or by treating with a dehydrating agent, as sulfuric acid, phosphorus pentoxide, or the like, to effect its conversion into a compound having the following structure and which is in equilibrium with its tautomeric form:

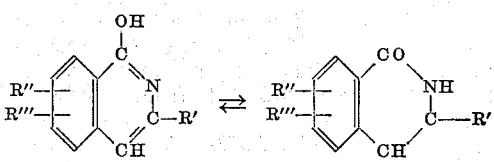

Final product where R', R" and R''' are as given above; and which is useful as an intermediate for the preparation of various substituted compounds having physiological action.

More specifically, the dehydration may be effected by dissolving the compound Intermediate I in convenient amounts of $H_2SO_4$, for example, 5 parts by weight to one of the compound to be dehydrated and warming the resultant solution on steam bath for ½ to 3 hours to effect removal of water. With some compounds heating will be unnecessary. The solution is then poured into cold water and the resultant precipitate collected and recrystallized from a suitable solvent, such as ethyl alcohol, isopropyl alcohol.

Dehydration may also be effected by dissolving the compound in benzene or similar solvent and treating with a suitable dehydrating agent, such as KHSO₄, P₂O₅, or the like, at a temperature of 20 to 80° C.

Alternatively, in some cases, the conversion of Intermediate I to the final product may be accomplished by heating Intermediate I to a temperature of 10° C.–100° C. above its melting point, depending upon the particular intermediate.

As more specifically illustrative of procedure in accordance with this invention, an amine salt having the structure given above will be dissolved in a convenient amount of water, for example, 0.1 m. of amine salt in 100 cc. of water, and either one or two equivalent amounts of alkali, as sodium or potassium hydroxide, added to the solution. The alkali solution will desirably be heated to facilitate the rearrangement with production of a compound having the structure of Intermediate I above, which when dehydrated by treatment with the dehydrating agent at a temperature within the range room temperature to 80° C. for about four hours, depending upon the temperature used, results in a compound having the structure noted above as the final product.

By way of specific illustration of procedure in accordance with this invention:

EXAMPLE 1

*1,2-dihydroisoquinolon-1*

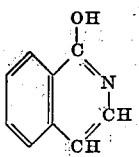

For the preparation of 4-hydroxy-1,2,3,4-tetrahydroisoquinolon-1, 79.8 grams of aminophthalidylmethane hydrochloride was dissolved in 100 cc. of warm water. Twenty-eight cubic centimeters of 40% sodium hydroxide were added and the solution was heated on a steam bath for five hours. After the reaction mixture stood overnight, 68.3 g. of a crystalline product were isolated.

1,2-dihydroisoquinolon-1 will then be prepared by adding one part of 4-hydroxy-1,2,3,4-tetrahydroisoquinolon-1 to three to six parts of concentrated sulfuric acid while stirring and cooling, to keep the temperature from rising above about 70° C. The resulting solution is then heated on a steam bath for 1–3 hours, cooled and poured into ice water. The resulting precipitate is collected and recrystallized from methanol or isopropanol.

EXAMPLE 2

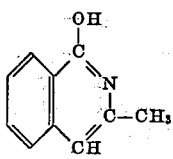

This compound will be prepared using the procedure described in Example 1, except that 1-amino-1-phthalidylethane will be used as a starting material to be rearranged in alkaline medium and subsequently dehydrated.

EXAMPLE 3

*3-ethyl-1,2-dihydroisoquinolon-1*

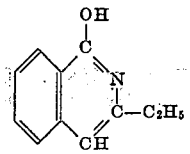

This compound will be prepared using the procedure described in Example 1, except that 1-amino-1-phthalidylpropane will be used as a starting material to be rearranged in alkaline medium and subsequently dehydrated.

EXAMPLE 4

*3-propyl-1,2-dihydroisoquinolon-1*

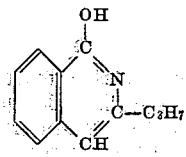

This compound will be prepared using the procedure described in Example 1, except that 1-amino-1-phthalidylbutane will be used as a starting material to be rearranged in alkaline medium and subsequently dehydrated.

EXAMPLE 5

*3-butyl-1,2-dihydroisoquinolon-1*

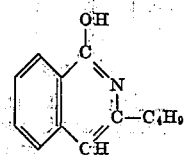

This compound will be prepared using the procedure described in Example 1, except that 1-amino-1-phthalidylpentane will be used as a starting material to be rearranged in akaline medium and subsequently dehydrated.

EXAMPLE 6

*3-ethyl-6,7-dimethyl-1,2-dihydroisoquinolon-1*

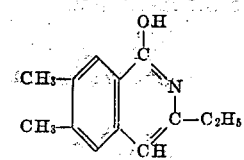

This compound will be prepared by heating an alkaline solution of 1 - amino - 1 - (5,6 - dimethyl phthalidyl)-propane as starting material followed by subsequent dehydration following the procedure described in Example 1 above.

EXAMPLE 7

*3-methyl-6,7-dichloro-1,2-dihydroisoquinolon-1*

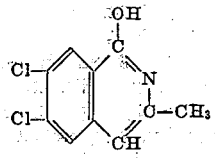

This compound will be prepared by heating an alkaline solution of 1 - amino - 1 - (5,6 - dichloro phthalidyl) ethane as starting material followed by subsequent dehydration following the procedure described in Example 1 above.

EXAMPLE 8

*7-ethyl-1,2-dihydroisoquinolon-1*

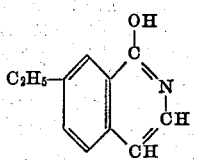

This compound will be prepared by heating an alkaline solution of amino - 6 - ethylphthalidyl methane as starting material followed by subsequent dehydration following the procedure described in Example 1 above.

EXAMPLE 9

*3-propyl-6,7-dimethoxy-1,2-dihydroisoquinolon-1*

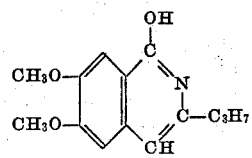

This compound will be prepared by heating an alkaline solution of 1-amino-1-(5,6-dimethoxyphthalidyl)-butane as starting material followed by subsequent dehydration following the procedure described in Example 1 above.

EXAMPLE 10

*3-butyl-7,8-dimethoxy-1,2-dihydroisoquinolon-1*

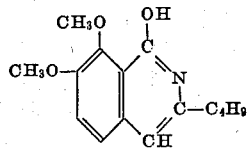

This compound will be prepared by heating an alkaline solution of 1-amino-1-(6,7-dimethoxyphthalidyl) - pentane as starting material followed by subsequent dehydration following the procedure described in Example 1 above.

EXAMPLE 11

*3-phenyl-7-ethoxy-1,2-dihydroisoquinolon-1*

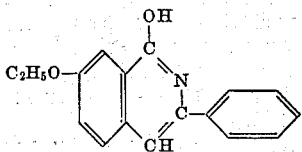

This compound will be prepared by heating an alkaline solution of 1-amino-1-(6,7-dimethoxyphthalidyl)-pentane as starting material followed by subsequent dehydration following the procedure described in Example 1 above.

EXAMPLE 12

*6,7-dihydroxy-3-benzyl-1,2-dihydroisoquinolon-1*

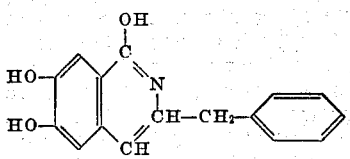

This compound will be prepared by heating an alkaline solution of 1-amino-1-(5,6-dihydroxyphthalidyl)-2-phenylethane as starting material followed by subsequent dehydration following the procedure described in Example 1 above.

EXAMPLE 13

*3-phenylisopropyl-7-bromo-1,2-dihydroisoquinolon-1*

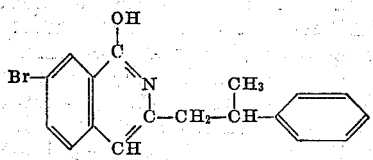

This compound will be prepared by heating an alkaline solution of 1 - amino - 1 - (6 - bromophthalidyl)-3-phenylbutane as starting material followed by subsequent dehydration following the procedure described in Example 1 above.

EXAMPLE 14

*3-ethyl-7-amino-1,2-dihydroisoquinolon-1*

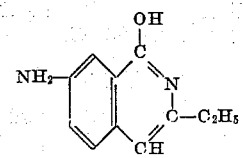

This compound was prepared by the rearrangement of 1-amino-1-(6-aminophthalidyl)-propane dihydrochloride, which in turn was prepared by the reduction of 1 - (6 - nitrophthalidyl) - 1-nitropropane as described below. This starting material, the dinitrophthalidylpropane in turn was prepared in the following manner, using generally the procedure of Shriner and Keyser (J. Org. Chem., volume 5, 200 (1940)).

A solution of 22.1 gms. of 1-nitro-1-phthalidylpropane melting at 94–96° C. in 20 ml. of concentrated sulfuric acid was added dropwise with stirring to a mixture of 11 gms. of potassium nitrate and 33 ml. of concentrated sulfuric acid, the reaction temperature being maintained lower than 5° C. After stirring for three hours at less than 10° C., the mixture was allowed to stand at room temperature for 16 hours and poured over cracked ice. The granular solid which separated was filtered and dried and melted at 93–96° C. Recrystallization from alcohol provided a product melting at 95–98° C.

30 gms. of the above dinitrophthalidylpropane was reduced using 160 cc. of glacial acetic acid and 0.1 gm. of platinum oxide at a temperature of 60–80°. 100% of the theoretical volume of hydrogen corresponding to the reduction of one nitro group was taken up in a period of 10 minutes, after which further absorption of hydrogen was very slow. The hot solution was removed, filtered and cooled whereupon a light orange product was separated by filtration, which melted at 178–181° C. Further purification by refluxing in alcohol and butanone followed by distillation yielded a purer product of 1-(6-aminophthalidyl)-1-nitropropane, melting at 182–184° C.

113 gms. of 1-nitro-1-(6-aminophthalidyl)-propane was reduced using a saturated aqueous solution containing one equivalent of hydrochloric acid under 50 pounds per square inch pressure of hydrogen at 60° C. using a palladium-on-carbon catalyst. After removal of the catalyst the combined aqueous solution containing 1-amino-1-(6-aminophthalidyl)-propane dihydrochloride was made definitely alkaline by the addition of excess 40% sodium hydroxide solution to effect rearrangement to the corresponding isoquinolon. The resulting mixture was heated at 90° C. under vacuum and 1.5 liters of water was slowly distilled for a period of six hours. Heating was then continued for a period of 5 hours removing an additional 250 cc. of water. The dark mixture was then cooled to 10° and the solid was removed by filtration. The dark filtrate was then acidified and further filtered to remove additional salt, and cooled over a long period of time. The yield was a white crystalline powder product of 7-amino-3-ethyl-4-hydroxy-1,2,3,4 - tetrahydroisoquinolon-1 which melted at 216-217° C.

A solution of 21 g. of crude 7-amino-3-ethyl-4-hydroxy-1,2,3,4-tetrahydroisoquinolon-1 in 64 cc. of concentrated sulfuric acid was heated at 80-90° for 1.5 hours. It was then cooled to 30° and poured into 250 gms. of cracked ice. The resulting solution being made alkaline with 40% sodium hydroxide, a tan solid formed which was removed by filtration, washed with water, and dried at 45°, which product melted at 195-197° C. Three recrystallizations from the alcohol raised the melting point to 202-203° C.

EXAMPLE 15

7 - acetylamino-3-ethyl-1,2-dihydroisoquinolon-1

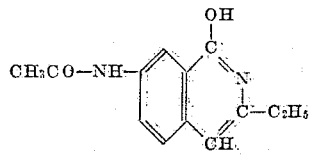

A solution of 1 gm. of 7-amino-3-ethyl-1,3-dihydroisoquinolon-1 (prepared as an intermediate in Example 4 above) in 5 cc. of warm glacial acetic acid was diluted with 5.5 cc. of water. The resulting solution was cooled to 35° and 0.8° (.008 n.) of acetic anhydride was added. The resulting solution was shaken intermittently for 2.1 hours at room temperature, diluted with 5 cc. of water and cooled to 5°. Separation of the product is accomplished by filtration, followed by washing with water and drying. The resulting material was completely soluble in 6-N-hydrochloric acid and melted at 274-277° C. Crystallization from acetic acid and water gave an almost white product which melted at 276-278° C.

EXAMPLE 16

3-ethyl-7-butyrylamino-1,2-dihydroisoquinolon-1

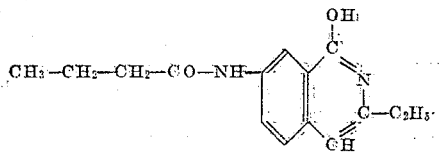

This compound will be prepared by rearrangement of 1-amino-1-(6-butyrylaminophthalidyl)-propane dihydrochloride using the procedure of Example 14 followed by dehydration to the corresponding dihydroisoquinolon. The starting material is prepared by subjecting 1-(6-aminophthalidyl)-1-nitropropane to treatment in the usual manner with butyric anhydride to effect N-butyrylation. The nitro group of the resulting butyrylamino compound is then reduced using the procedure of Example 14.

EXAMPLE 17

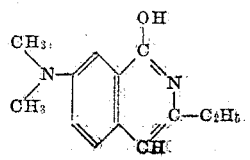

This compound is prepared by the rearrangement of 1 - (6 - dimethylaminophthalidyl) - 1-aminopropane using the procedure of Example 14 followed by dehydration to the corresponding dihydroisoquinolon. The starting material is prepared from 1-(6-aminophthalidyl)-1-nitropropane prepared as an intermediate in Example 14. This compound is methylated on the amino group by treatment with formaldehyde and formic acid according to the procedure of Clark et al., J. A. C. S. 55, 4571 (1933). The nitro group of the resulting dimethylamino compound is reduced to the corresponding amino compound using the procedure of Example 14.

EXAMPLE 18

3-phenyl-1,2-dihydroisoquinolon-1

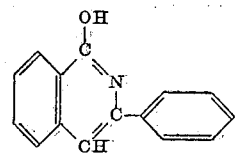

This compound is prepared by rearranging aminophenylphthalidylmethane (phenylphthalidyl carbinamine) followed by dehydration to the corresponding dihydroisoquinolon by the procedure of Example 1.

EXAMPLE 19

3-n-amyl-1,2-dihydroisoquinolon-1

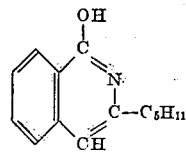

To a solution of 1.0 g. of 1-amino-1-phthalidylhexane hydrochloride in 25 cc. of warm water is added a solution of 0.4 g. of sodium hydroxide in 5 cc. of water. The resulting mixture is heated just below reflux for 20 hours. The oil which separates is taken into choloroform and the chloroform is removed by distillation in vacuo. The white solid which remains is dissolved in 7.5 cc. of concentrated sulfuric acid and this solution is heated at 75° for 35 minutes. It is then cooled and poured into cracked ice. The white solid is removed by filtration, washed with water and recrystallized three times from isopropanol, melting at 106.5-108°.

The compounds produced by the method in accordance with this invention will be used as intermediates for the production of corresponding aminoalkoxyisoquinoline derivatives having physiological properties by treating them with a reagent, as, for example, phosphorous oxychloride, to produce the corresponding 1-chloroisoquinoline derivatives and reacting such derivatives with an amino alcohol of the formula YROH where Y is a tertiary nitrogen-linked amino group including a member of the group consisting of aliphatic groups of not over ten carbon atoms, a pyridine group and where N is a member of the group containing not more than six carbon atoms.

More specifically, the intermediates produced by the dehydration of compounds in accordance with this invention will be converted to the 1-chloro derivatives by heating under reflux until the evolution of oxygen chloride ceases. The excess oxychloride is then removed by distillation and the product purified by distillation in vacuo.

The 1-chloro derivatives are then treated with an alkali metal derivative of an amino alcohol of the type indicated by adding the 1-chloro derivative to a suspension or solution of the alkali metal derivative of the amino alcohol, the addition being made rapidly with stirring, followed by heating, with continued stirring, to a temperature up to the boiling point of the solvent. On completion of the reaction, the reaction mixture is cooled and evaporated to remove precipitated metal chloride, the solvent removed by distillation and the aminoalkoxyisoquinoline derivative purified by distillation in vacuo, all as more specifically disclosed in application for United States Patent filed by me August 20, 1948, Serial No. 45,432, now abandoned.

This application is a continuation-in-part of application filed by me August 17, 1946, Serial No. 691,394, now abandoned.

What is claimed is:

1. The method of producing an isoquinoline derivative having the structure

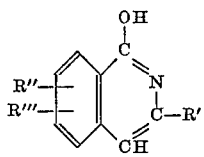

where R' is a member of the group consisting of hydrogen, alkyl groups having not more than ten carbon atoms, a phenyl group and phenylalkyl groups, the alkyl portion of which has not more than three carbon atoms; R'' and R''' are members of the group consisting of hydrogen, hydroxyl, methyl, methoxy, ethoxy, amino, acylamino having not in excess of five carbon atoms and alkylamino having not in excess of three carbon atoms, the said substituents being so chosen that the number of nitrogen atoms in the substituents does not exceed one, which comprises rearranging a compound having the structure

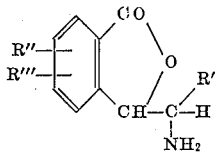

in which R', R'' and R''' are as given above, by dissolving said compound in a solvent therefor and dehydrating the product of the rearrangement.

2. The method of producing an isoquinoline derivative according to claim 1, characterized by the fact that an alkali is included in the solution formed.

3. The method of producing an isoquinoline derivative according to claim 1, characterized by the fact that the solution formed is heated to a temperature below the boiling point of the solvent.

4. The method of producing an isoquinoline derivative according to claim 1, characterized by the fact that the solvent is selected from the group consisting of water and a monohydric alcohol.

5. The method of producing an isoquinoline derivative according to claim 1, characterized by the fact that the solvent is selected from the group consisting of water and a monohydric alcohol and that the solution formed is heated to a temperature below the boiling point of the solvent.

GLENN E. ULLYOT.

REFERENCES CITED

The following references are of record in the file of this patent:

Ullyot et al.: J. Org. Chem., vol. 10, pages 429–440 (1945).